United States Patent Office.

ANTHONY VAN HAAGEN AND WILLIAM ADAMSON, OF PHILADELPHIA, PENNSYLVANIA.

Letters Patent No. 99,978, dated February 15, 1870.

IMPROVED FERTILIZER FROM GLUE RESIDUUM.

The Schedule referred to in these Letters Patent and making part of the same.

We, ANTHONY VAN HAAGEN and WILLIAM ADAMSON, of Philadelphia, county of Philadelphia, State of Pennsylvania, have invented a new Fertilizer, of which the following is a specification.

Nature and Object of the Invention.

Our invention consists of a fertilizer derived substantially in the manner described hereafter, from glue residuum, which has hitherto been considered of little or no value; also, of the combination of the said fertilizer with charcoal or other equivalent absorbent possessing fertilizing properties.

General Description.

In manufacturing glue there remains in the kettles or boilers, after the size has been drawn off, a residuum, consisting of fatty matter, hair, bone, animal fibre, &c., combined in a matted mass. This residuum is of little or no commercial value, although it possesses valuable fertilizing properties, which are not fully available, owing partly to the undistributable condition of the residuum in its crude state, and to the difficulty of dissolving or melting the fatty ingredients, the presence of lime used by tanners in preparing the skins, the trimmings or clippings of which are used in the manufacture of glue, resisting all attempts to disintegrate the residuum by melting the fat.

In order to utilize this glue residuum, we first boil it in an alkaline solution in an open or closed vessel, and thereby decompose the mass, and reduce the fatty matter, hair, bone, animal fibre, &c., to a saponaceous fluid. To this we add common salt, which, soon dissolving, sets free the saponaceous matter derived from the action of the alkali on the fat, and this soap rising in the vessel, is removed, leaving a residuum which when cool becomes a jelly-like mass.

While the soap is available for many cleansing or other purposes, or for conversion into different qualities of marketable soaps, as described in a separate application for a patent, the jelly-like residuum is at once available as a valuable and rapidly-acting manure.

We have found that about fifty pounds of a solution of caustic alkali of the strength of about 25° Baume will be required for treating one hundred pounds of glue residuum of the ordinary quality, and that about twelve pounds of salt will be required to set free the soap derived from the fatty ingredients of the same quantity of glue residuum.

In giving these proportions, however, it should be understood that they cannot be adhered to in all cases, for the presence of different quantities of fatty matter in the glue residuum will demand different proportions or strengths of alkali, and, therefore, the quantity of alkali and salt used must be determined to some extent by the judgment of the attendant, guided by his knowledge of the varying qualities of the glue residuum.

After the removal of the soap obtained by the alkali treatment, and before the residuum becomes cool, it may be mixed with charcoal or plaster of Paris, or other absorbent possessing within itself fertilizing properties, the composition thus formed being a valuable manure, easy of transportation, admitting of being readily distributed, and quickly soluble on being exposed.

Claims.

1. A fertilizer composed of glue residuum, treated substantially in the manner described.

2. The said fertilizer in combination with charcoal or other equivalent absorbent.

In testimony whereof, we have signed our names to this specification in the presence of two subscribing witnesses.

ANTHONY VAN HAAGEN.
WM. ADAMSON.

Witnesses:
E. H. BAILEY,
WM. A. STEEL.